(12) United States Patent
Song et al.

(10) Patent No.: US 7,385,663 B2
(45) Date of Patent: *Jun. 10, 2008

(54) LIQUID CRYSTAL DISPLAY HAVING A PIXEL AREA DIVIDED INTO MULTIPLE DOMAINS

(75) Inventors: Jang-Kun Song, Seoul (KR); Jin-Oh Kwag, Kyungki-do (KR); Sang-Soo Kim, Kyungki-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

This patent is subject to a terminal disclaimer.

(21) Appl. No.: 11/502,197

(22) Filed: Aug. 10, 2006

(65) Prior Publication Data

US 2006/0274251 A1 Dec. 7, 2006

Related U.S. Application Data

(60) Continuation of application No. 11/107,929, filed on Apr. 18, 2005, now Pat. No. 7,110,078, which is a continuation of application No. 10/699,819, filed on Nov. 4, 2003, now Pat. No. 6,894,753, which is a division of application No. 09/559,483, filed on Apr. 27, 2000, now Pat. No. 6,657,695.

(30) Foreign Application Priority Data

Jun. 30, 1999 (KR) .............................. 1999-26027

Jul. 14, 1999 (KR) .............................. 1999-28449

(51) Int. Cl.
*G02F 1/1343* (2006.01)
*G02F 1/1337* (2006.01)
(52) U.S. Cl. .................. 349/143; 349/129; 349/130
(58) Field of Classification Search ................ 349/129, 349/143, 130, 128
See application file for complete search history.

(56) References Cited

U.S. PATENT DOCUMENTS

| | | | | |
|---|---|---|---|---|
| 5,327,268 A | * | 7/1994 | Takabatake et al. | 349/42 |
| 5,790,219 A | * | 8/1998 | Yamagishi et al. | 349/106 |
| 6,894,753 B2 | * | 5/2005 | Song et al. | 349/129 |
| 7,110,078 B2 | * | 9/2006 | Song et al. | 349/143 |

* cited by examiner

*Primary Examiner*—Mike Qi
(74) *Attorney, Agent, or Firm*—F. Chau & Associates, LLC

(57) ABSTRACT

A liquid crystal display includes a first substrate having a plurality of pixel areas. At least one pair of first and second protrusions is formed at each pixel area. A pixel electrode is formed at each pixel area. The pixel electrode has an opening pattern exposing the first protrusion while covering the second protrusion. A second substrate faces the first substrate. A common electrode is formed at the second substrate. Alternatively, the opening pattern and the protrusions may be formed in parallel.

12 Claims, 9 Drawing Sheets

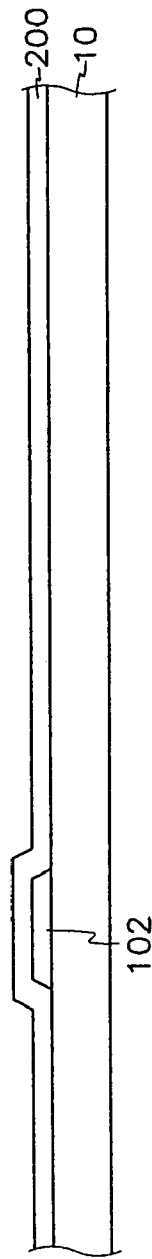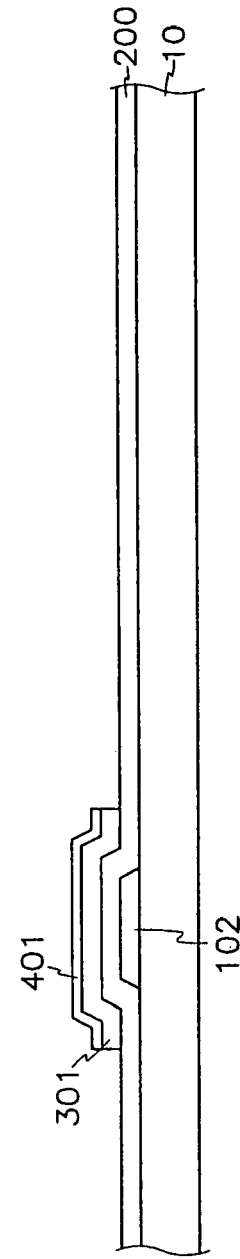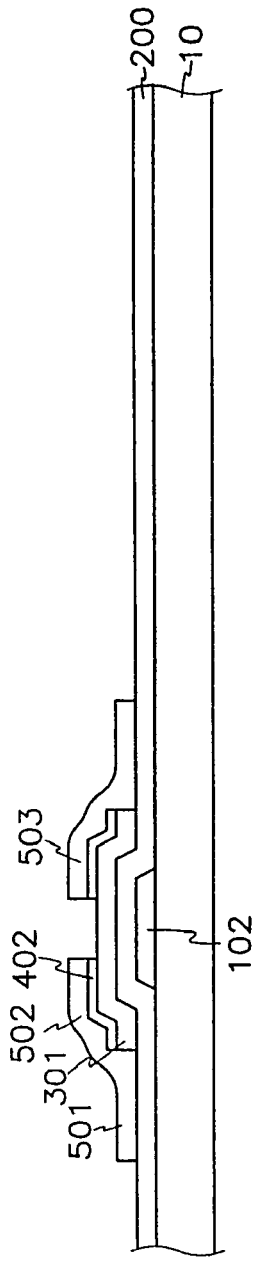

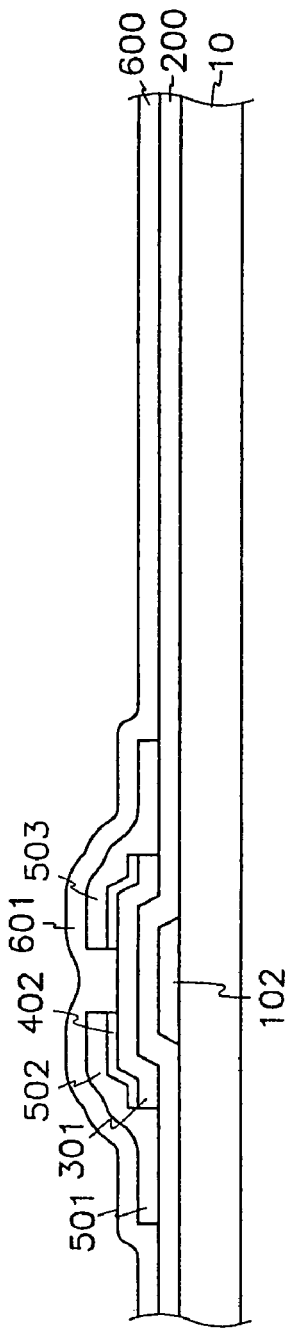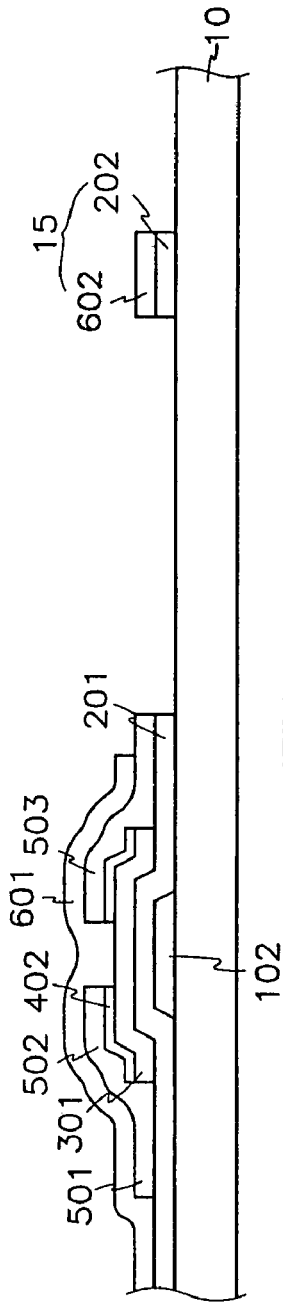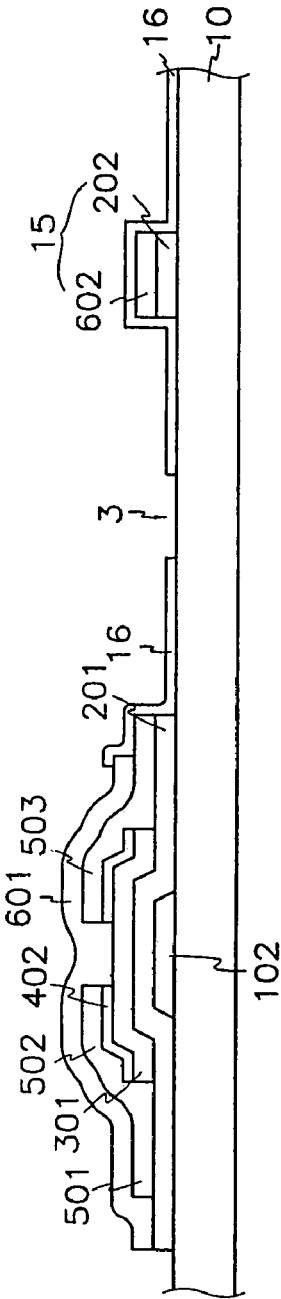

LIQUID CRYSTAL DISPLAY HAVING A PIXEL AREA DIVIDED INTO MULTIPLE DOMAINS

CROSS-REFERENCE TO RELATED APPLICATION

This application is a continuation of U.S. patent application Ser. No. 11/107,929, filed on Apr. 18, 2005, now U.S. Pat. No. 7,110,078 which is a continuation of U.S. patent application Ser. No. 10/699,819 filed Nov. 4, 2003 now U.S. Pat. No. 6,894,753, issued on May 17, 2005, which is a divisional of U.S. patent application Ser. No. 09/559,483 filed Apr. 27, 2000 now U.S. Pat. No. 6,657,695, issued on Dec. 2, 2003, which claims priority to Korean Patent Application No. 1999-26027, filed on Jun. 30, 1999 and Korean Patent Application No. 1999-28449, filed on Jul. 14, 1999, the disclosures of which are incorporated by reference herein in their entirety.

BACKGROUND OF THE INVENTION (a) Field of the Invention

The present invention relates to a liquid crystal display and, more particularly, to a vertical alignment liquid crystal display which has a structure capable of dividing a pixel area into multiple domains with different orientation directions of liquid crystal molecules.

(b) Description of the Related Art

Generally, liquid crystal displays have a structure where a liquid crystal is sandwiched between two substrates, and an electric field is applied to the liquid crystal display to control the amount of light transmission.

In the twisted nematic (TN) liquid crystal displays, the liquid crystal molecules injected into the gap between the two substrates are oriented parallel to the substrates, and spirally twisted with a predetermined pitch. The long axis (usually called the "director") of the liquid crystal molecules continuously varies in orientation direction, and the viewing angle characteristics depend upon such orientation directions of the liquid crystal molecules However, the TN liquid crystal display, light is not completely blocked at an off state in the normally black mode so that a poor contrast ratio results. The contrast ratio is altered depending upon the viewing angle, and there is a half tone of brightness difference depending on the viewing angle so that stable picture images cannot be obtained. Furthermore, the picture qualities at side edge portions of the screen are not symmetrical to each other with respect to the middle portion. These all result in poor viewing angle characteristics.

However, the vertical alignment liquid crystal displays where the liquid crystal molecules are vertically aligned in the absence of a voltage but twisted in various directions with the voltage applied exhibit excellence in various aspects, such as contrast ratio and response speed compared to the TN liquid crystal displays. Furthermore, when a compensation film is used to divide the twisting of the liquid crystal molecules in various predetermined directions, a wide viewing angle can be effectively obtained.

Recently, a technique for forming an alignment control member such as a pyramid-shaped protrusion on the substrates, a technique for forming an opening pattern at the transparent electrodes, and a technique for forming a protrusion pattern on one of the substrates while forming an opening pattern at the other substrate have been proposed as methods to control the orientation directions of the liquid crystal molecules. The protrusion or opening pattern is designed to achieve four domain divisions in the orientation direction of the liquid crystal molecules at which the efficiency of light usage becomes highest.

FIGS. 1A and 1B are cross sectional views of a liquid crystal display according to a prior art where the orientation states of liquid crystal molecules are illustrated in the absence and presence of the voltage application.

As shown in the drawings, a transparent pixel electrode 11 is formed at a bottom substrate 10, and a first opening portion 1 is formed at the pixel electrode 11. A top substrate 20 facing the bottom substrate 10 is provided with a transparent common electrode 21. A second opening portion 2 is formed at the common electrode 21. The bottom and top substrates 10 and 20 are arranged such that the first opening portion 1 is displaced with respect to the second opening portion 2. Negative dielectric anisotropy liquid crystal molecules 30 are injected into the gap between the bottom and top substrates 10 and 20.

As shown in FIG. 1A, the liquid crystal molecules 30 are oriented perpendicular to the substrates 10 and 20 in the absence of the voltage application.

As shown in FIG. 1B, when voltage is applied to the pixel electrode 11 and the common electrode 21, most of the regions at the pixel area are under the influence of an electric field normal to the substrates 10 and 20, but the regions adjacent to the opening portions 1 and 2 are under a fringe field beginning from the edges of the opening portions 1 and 2 and focused onto the common electrode 21 and the pixel electrode 11, respectively. As the negative dielectric anisotropy liquid crystal molecules 30 are inclined to orient in a direction normal to that of the electric field, the long axes of the liquid crystal molecules adjacent to the opening portions 1 and 2 are twisted while being tilted with respect to the substrates 10 and 20. In this case, two side regions of either of the opening portions 1 and 2 where the orienting directions of the liquid crystal molecules 30 are opposite to each other are present so that the optical characteristics of the two side regions are compensated, resulting in a wide viewing angle.

FIGS. 2A and 2B are cross sectional views of a liquid crystal display according to another prior art where the orientation states of liquid crystal molecules are illustrated in the absence and presence of voltage application.

As shown in FIGS. 2A and 2B, a pixel electrode 12 based on a transparent conductive material such as indium tin oxide is formed at a bottom substrate 10, and a pyramid-shaped first protrusion 13 and a vertical alignment film (not shown) are sequentially formed on the pixel electrode 12. A transparent common electrode 22 is formed at a top substrate 20, and a second pyramid-shaped protrusion 23 and a vertical alignment film (not shown) are sequentially formed at the common electrode 22. Negative dielectric anisotropy liquid crystal molecules 30 are injected into the gap between the vertical alignment films of the bottom and top substrates 10 and 20.

As shown in FIG. 2A, in the absence of voltage application, most of the liquid crystal molecules 30 are oriented perpendicular to the vertical alignment films, but the liquid crystal molecules 30 positioned close to the protrusions 13 and 23 are tilted with respect to the vertical alignment films at predetermined angles.

As shown in FIG. 2B, when voltage is applied to the pixel and common electrodes 12 and 22, the liquid crystal molecules are twisted in a direction parallel to the substrates 10 and 20. As the liquid crystal molecules 30 positioned close to the protrusion 13 are tilted in the opposite directions with respect to the region of the protrusion 13 in the absence of the voltage application, the twisting directions thereof are also opposite to each other with the voltage applied. Therefore, two side regions of the protrusion 13 where the twisting directions of the liquid crystal molecules are opposite to each other are present so that the optical characteristics of the two regions are compensated, resulting in a wide viewing angle. In addition, disclination regions where the orientation directions of the liquid crystal molecules 30 are disorderly altered are focused at the regions of the protrusions 13 and 23 so that a black matrix for shielding the disclination regions can be formed in a predetermined manner.

However, in order to fabricate the above-described liquid crystal displays, additional processes for forming the protrusions 13 and 14 or the opening portions 1 and 2 must be performed.

On the one hand, in the case of the liquid crystal display shown in FIGS. 1A and 1B, a wet etching process for forming the opening portion 2 at the ITO-based common electrode 21 of the top substrate 20 should be provided. Furthermore, in order to prevent the color filter from being contaminated or damaged due to the etching solution, a protective layer of organic or inorganic materials should be coated onto the color filter before the ITO processing.

On the other hand, in the case of the liquid crystal display shown in FIGS. 2A and 2B, before the formation of the protrusions 13 and 23, separate organic layers should be coated onto the pixel electrode 12 and the common electrode 22, and etched.

SUMMARY OF THE INVENTION

It is an object of the present invention to provide a vertical alignment liquid crystal display which has a multi-domain pixel structure.

It is another object of the present invention to provide a vertical alignment liquid crystal display with a multi-domain pixel structure which can be fabricated in a simplified manner.

These and other objects may be achieved by a liquid crystal display with the following structure.

According to one aspect of the present invention, the liquid crystal display includes a first substrate having a plurality of pixel areas. At least one pair of first and second protrusions formed parallel to each other are provided at each pixel area. A pixel electrode is formed at each pixel area. The pixel electrode has an opening pattern exposing the first protrusion while covering the second protrusion. A second substrate faces the first substrate, and a common electrode is formed at the second substrate. A negative dielectric anisotropy liquid crystal is sandwiched between the first and second substrates. A first vertical alignment film is coated on the common electrode, and a second vertical alignment film is coated on the pixel electrode and the first protrusion.

A thin film transistor is formed at each pixel area. The thin film transistor includes a gate electrode, a gate insulating layer formed on the gate electrode, a semiconductor pattern formed on the gate insulating layer over the gate electrode, and source and drain electrodes overlapped with side edges of the semiconductor pattern. A protective layer covers the thin film transistor.

The first and second protrusions are formed with the same material as at least one of the gate insulating layer, the semiconductor pattern and the protective layer. The pixel electrode and the common electrode are formed with indium tin oxide or indium zinc oxide.

According to another aspect of the present invention, the liquid crystal display includes a first substrate having a plurality of pixel areas, and a plurality of protrusions formed at each pixel area of the first substrate. A pixel electrode covers the protrusions. The pixel electrode has opening portions. The opening portions and the protrusions are formed in parallel. A second substrate faces the first substrate, and a common electrode is formed at the second substrate. A negative dielectric anisotropy liquid crystal is sandwiched between the first and second substrates. Vertical alignment films are coated on the common electrode and the pixel electrode, respectively. The cross section of the protrusion is shaped as a rectangle.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 10A to 10F are cross sectional views of the liquid crystal display shown in FIG. 5, illustrating the steps of processing a TFT array substrate for the liquid crystal display in a sequential manner.

DETAILED DESCRIPTION OF THE PREFERRED EMBODIMENTS

Preferred embodiments of this invention will be explained with reference to the accompanying drawings.

Figure 1A:
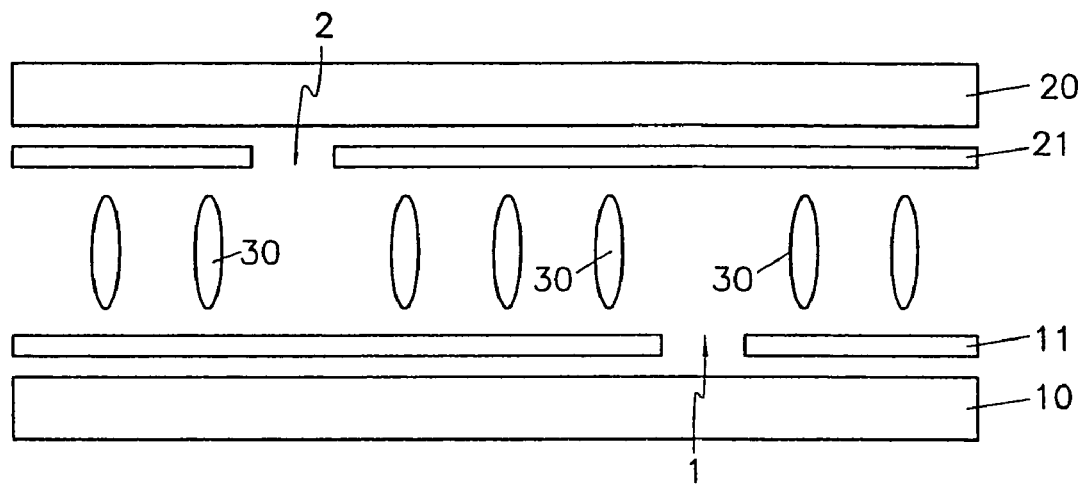
FIGS. 1A and 1B are cross sectional views of a liquid crystal display according to a prior art, illustrating the orientation states of liquid crystal molecules when voltage application is absent and present, respectively.
Figure 1B:
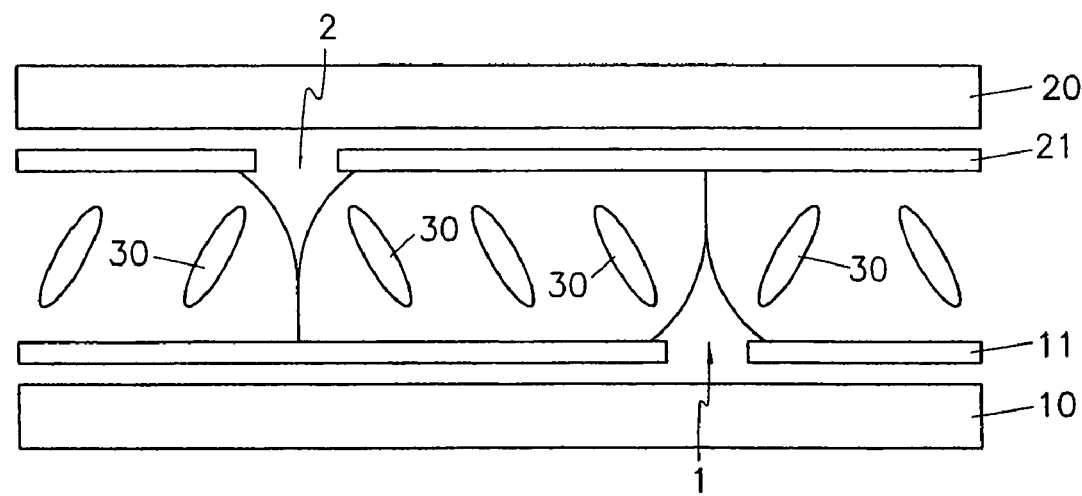
Figure 2A:
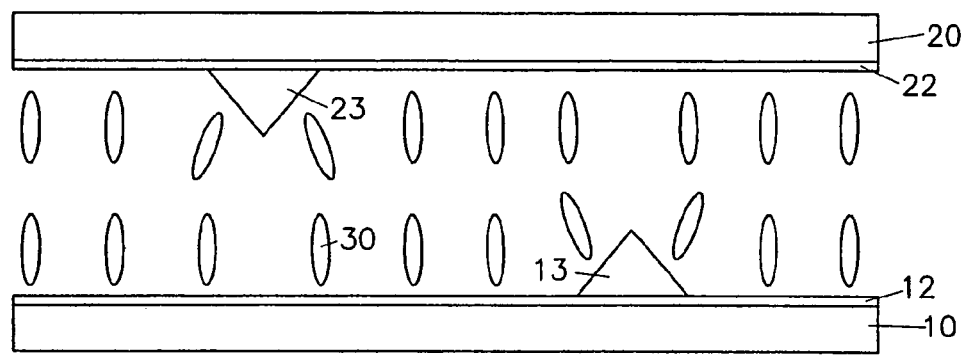
FIGS. 2A and 2B are cross sectional views of a liquid crystal display according to another prior art, illustrating the orientation states of liquid crystal molecules when voltage application is absent and present, respectively
Figure 2B:
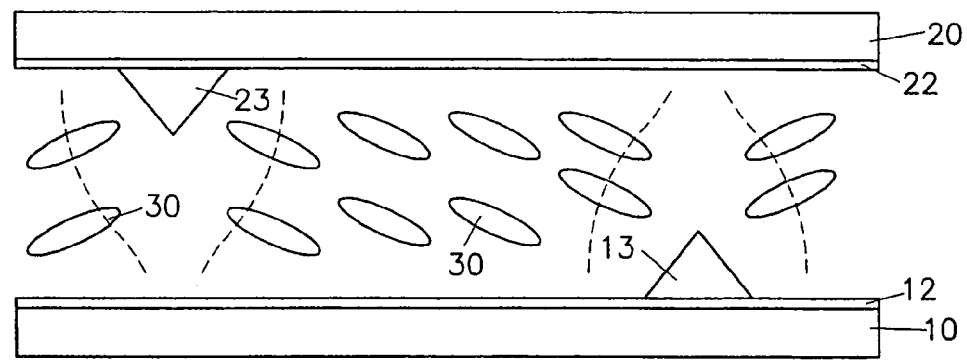
Figure 3:
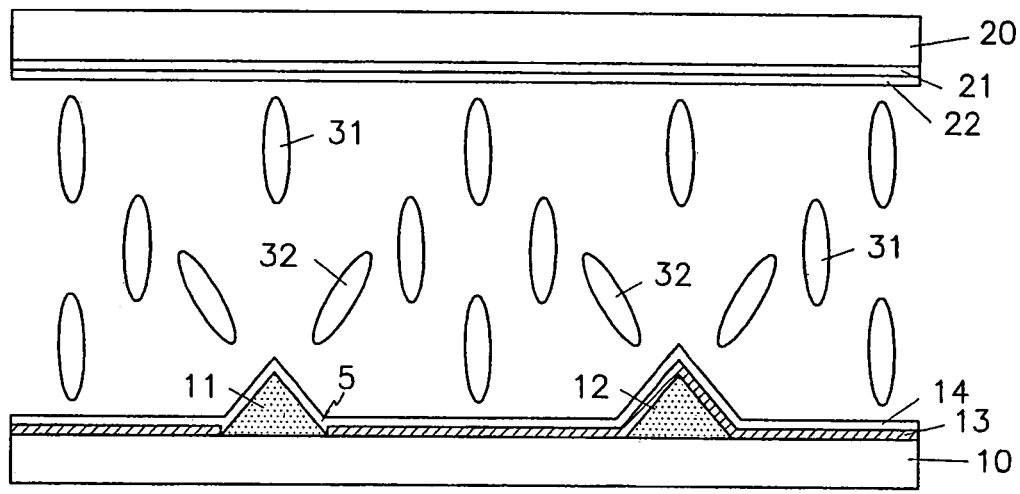
FIG. 3 is a cross sectional view of a liquid crystal display according to a preferred embodiment of the present invention, illustrating the orientation states of liquid crystal molecules when voltage application is absent.

FIG. 3 is a cross sectional view of a liquid crystal display with a TFT array substrate and a color filter substrate according to a preferred embodiment of the present invention.

The TFT array substrate 10 has a plurality of pixel areas at which a gate electrode, a gate insulating layer, a semiconductor pattern, and source and drain electrodes are sequentially formed. As shown in FIG. 3, a pair of pyramid-shaped protrusions 11 and 12 are formed at each pixel area. The protrusions 11 and 12 may be formed with the same material as the semiconductor pattern, the gate insulating layer, or a protective layer covering the source and drain electrodes.

A pixel electrode 13 covers the protrusion 12 and the TFT array substrate 10, and it has an opening pattern 5 exposing the protrusion 11. A first vertical alignment film 14 is coated on the pixel electrode 13 and the exposed protrusion 11 to vertically align negative dielectric anisotropy liquid crystal molecules 31 and 32.

In addition, the color filter substrate 20 is sequentially overlaid with a transparent common electrode 21 and a second vertical alignment film 22 such that they face the TFT array substrate 10.

The liquid crystal molecules 31 and 32 are injected into the gap between the TFT array substrate 10 and the color filter substrate 20. Most of the liquid crystal molecules 31 are oriented perpendicularly to the substrates 10 and 20 due to the vertical alignment films 21 and 22, whereas the liquid crystal molecules 32 adjacent to the protrusions 11 and 12 are tilted with respect to the substrates 10 and 20, at predetermined angles.

Figure 4:
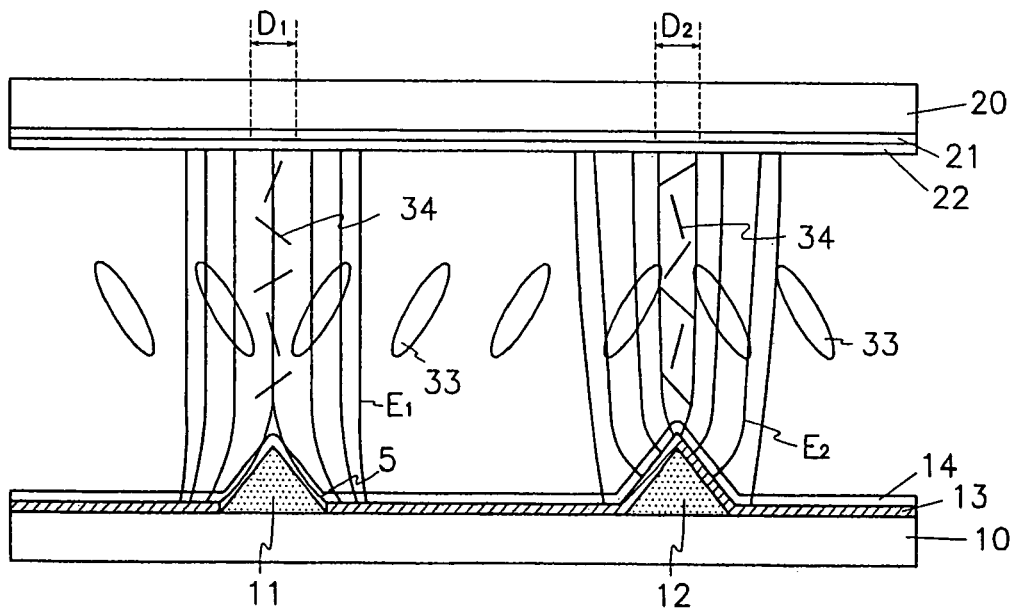
FIG. 4 is a cross sectional view of the liquid crystal display shown in FIG. 3, illustrating the orientation states of the electric fields and liquid crystal molecules with the voltage applied.

FIG. 4 illustrates the orientation states of the liquid crystal molecules under the application of voltage.

As shown in FIG. 4, when voltage is applied to the pixel electrode 13 of the TFT array substrate 10 and the common electrode 21 of the color filter substrate 20, a vertical electric field is formed at most of the pixel area, excepting some regions. That is, a hill-shaped electric field E1 is formed at the pixel regions at either side of the opening pattern 5 of the pixel electrode 13 exposing the protrusion 11. The hill-shaped electric field E1 begins from the boundary of the opening pattern 5 and is focused onto the common electrode 21 of the color filter substrate 20. Furthermore, a valley-shaped electric field E2 is formed at the side pixel regions of the protrusion 12 covered by the pixel electrode 13. The valley-shaped electric field E2 begins from the center of the protrusion 12, and spreads over the common electrode 21.

The electric fields E1 and E2 are symmetrically formed with respect to each center of the opening pattern 5 and the protrusion 12, making the liquid crystal molecules 33 at the side regions thereof to be tilted in opposite directions. In this way, the optical characteristics of the liquid crystal molecules 33 at the side pixel regions related to the opening pattern 5 or the protrusion 12 are compensated, resulting in wide viewing angle.

Disclination areas D1 and D2 where liquid crystal molecules 34 are disorderly oriented are present at the borderline pixel regions between the side pixel regions. Such disclination areas appear to be wider at the borderline pixel region related to the opening pattern 5 than at the borderline pixel region related to the second protrusion 12. However, since the first protrusion 11 is internally formed at the opening pattern 5, the width of the disclination area D1 related to the opening pattern 5 is significantly reduced. The reason is that the orientation direction of the liquid crystal molecules 32 at the opening pattern 5 before the application of voltage stands in the direction of the electric field E1 with a relatively large angle. As the liquid crystal molecules 32 are initially tilted at a predetermined angle with respect to the substrate 10, the required energy for vertically aligning the liquid crystal molecules 32 with respect to the direction of the electric field E1 is relatively low so that the orientation of most of the liquid crystal molecules 33 can be easily established. Therefore, the relatively wide disclination area related to the opening pattern 5 alone can be narrowed with the addition of the protrusion 11, and focused onto the apex of the protrusion 11 in a stable manner.

Figure 5:
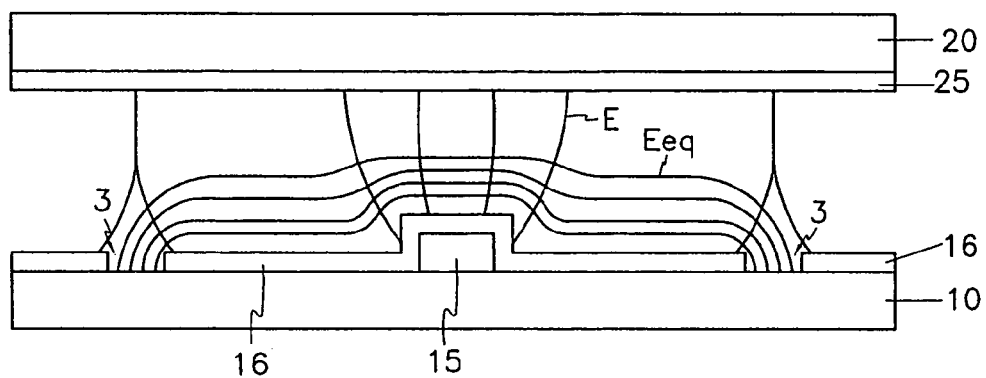
FIG. 5 is a cross sectional view of the liquid crystal display shown in FIG. 3, illustrating the shapes of the electric fields at different domains.

FIG. 5 is a cross sectional view of a liquid crystal display according to a second preferred embodiment of the present invention, where electric fields for realizing multi-domain orientation of liquid crystal molecules are illustrated.

As shown in FIG. 5, a protrusion pattern 15 having a rectangular-shaped cross section is formed at the gate insulating layer and the protective layer over the TFT array substrate 10, and a pixel electrode 16 of indium tin oxide (ITO) or indium zinc oxide (IZO) covers the protrusion pattern 15. An opening pattern 3 is formed at the pixel electrode 16 while being alternately arranged with the protrusion patterns 15. At least one protrusion pattern 15 and one opening pattern 30 are provided within each pixel area. The color filter substrate 20 is overlaid with color filters (not shown) and a transparent common electrode 25 covering the color filters such that they face the TFT array substrate.

When voltage is applied to the common electrode 25 and the pixel electrode 16, electric fields E and equi-potential lines Eeq are formed between the TFT array substrate 10 and the color filter substrate 20. That is, a hill-shaped electric field E is formed at the opening pattern 3 while beginning from the edge of the opening pattern 3 and focusing onto the common electrode 25 of the color filter substrate 20. A valley-shaped electric field E is formed at the protrusion pattern 15 while beginning from the center of the protrusion pattern 15 and spreading over the common electrode 25. Therefore, the electric fields E and the equipotential lines Eeq uniformly appear in a symmetrical manner with respect to the center of the protrusion pattern 15 or the opening pattern 3.

Figure 6:
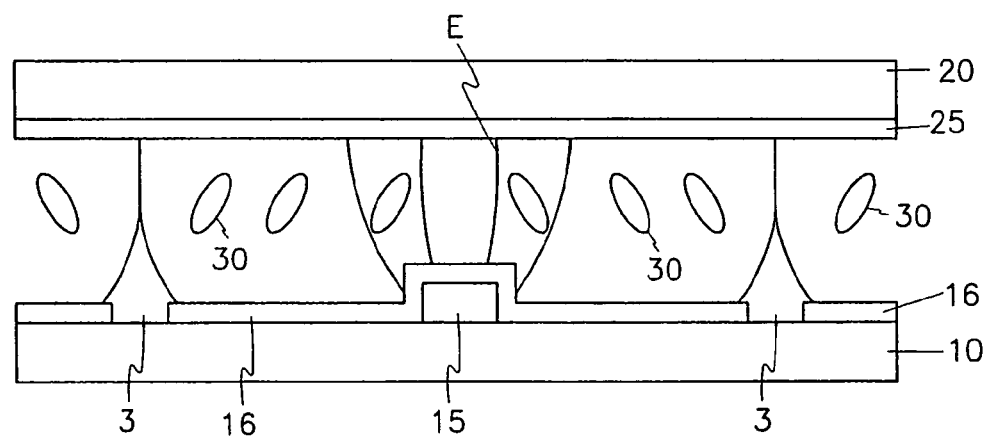
FIG. 6 is a cross sectional view of the liquid crystal display shown in FIG. 3, illustrating the orientation states of the liquid crystal molecules due to the electric fields.

FIG. 6 illustrates the orientation state of the liquid crystal molecules under the influence of the electric fields shown in FIG. 5.

As shown in FIG. 6, the negative dielectric anisotropy liquid crystal molecules 30 injected into the gap between the two substrates 10 and 20 are tilted symmetrical to each other at two side regions of either of the protrusion pattern 15 and the opening pattern 3 because the long axis thereof is inclined to be oriented perpendicular to the electric fields E or parallel to the equipotential lines. Therefore, the optical characteristics of the liquid crystal molecules at the two side regions are compensated, resulting in a wide viewing angle.

Figure 7:
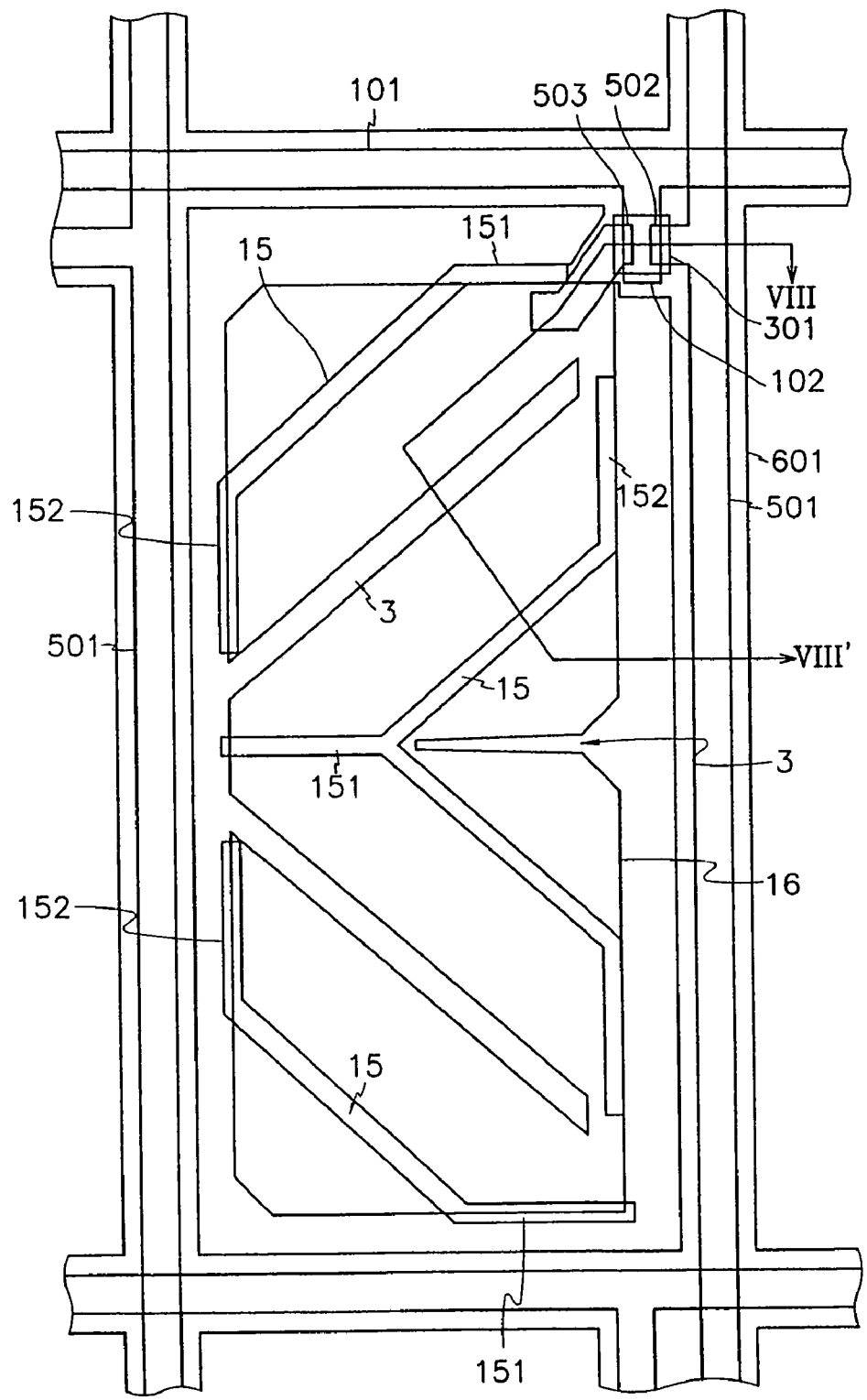
FIG. 7 is a plan view of the liquid crystal display shown in FIG. 5.
Figure 8:
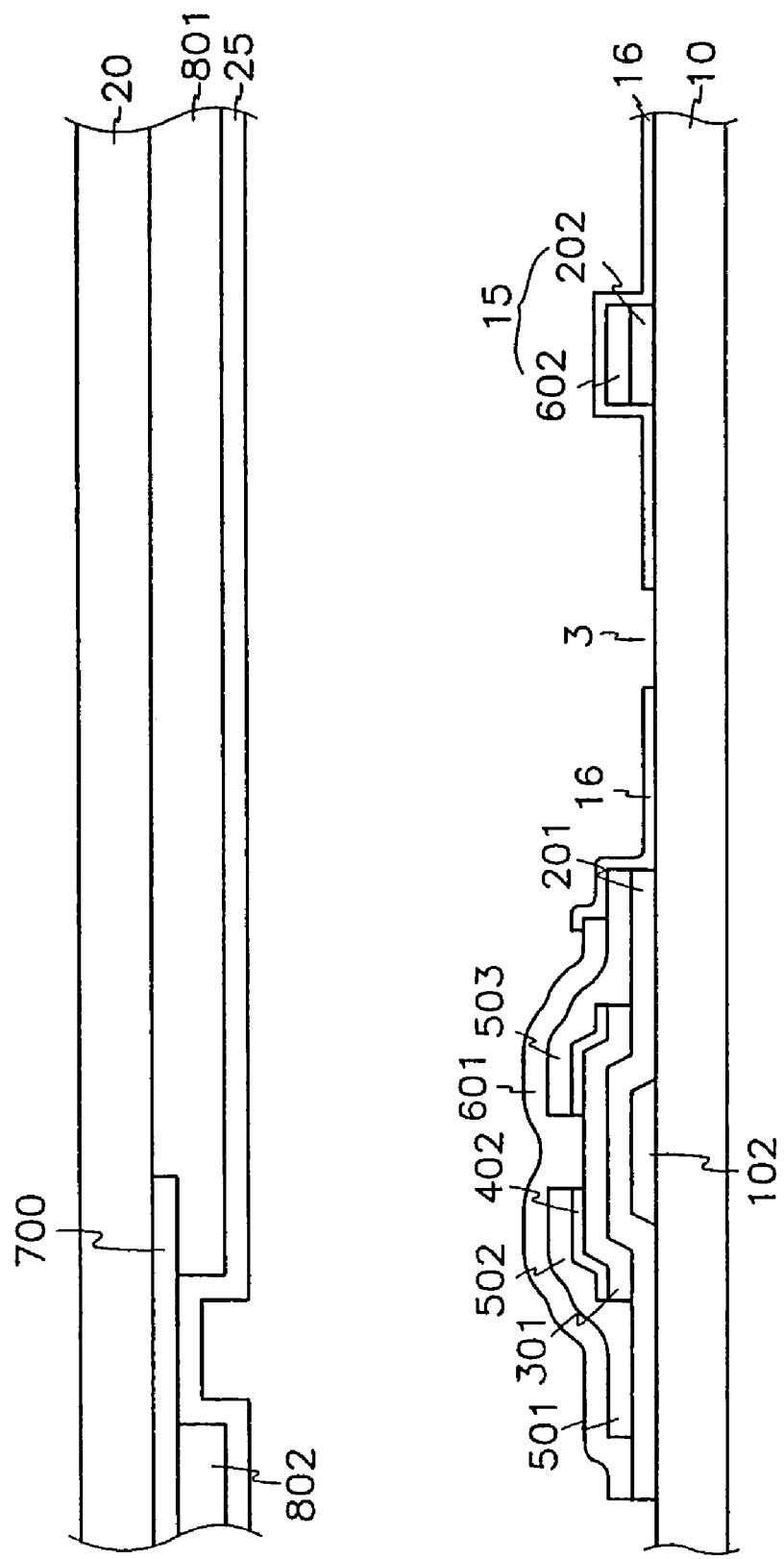
FIG. 8 is a sectional view of the liquid crystal display taken along the VIII-VIII' line of FIG. 7.

FIG. 7 is a plan view of the liquid crystal display shown in FIG. 6, and FIG. 8 is a sectional view of the liquid crystal display taken along the VIII-VIII' line of FIG. 7.

As shown in the drawings, the TFT array substrate 10 is overlaid with a gate line assembly including gate lines 101 formed in the horizontal direction, and gate electrodes 102 extended from the gate lines 101. A first gate insulating pattern 201 covers the gate line 101 and the gate electrode 102. An amorphous silicon semiconductor pattern 301 is formed on the first gate insulating pattern 201 over the gate electrode 102. A doped amorphous silicon ohmic contact pattern 402 is formed on the semiconductor pattern 301 while being absent over the gate electrode 102. Data lines 501 proceeding in the vertical direction are formed on the first gate insulating pattern 201 such that they cross the gate lines 101. Source electrodes 502 are extended from the data lines 501 while contacting the ohmic contact pattern 402 at one side, and drain electrodes 503 are separately positioned opposite to the source electrodes 502 with respect to the gate electrodes 102 while contacting the ohmic contact pattern 402 at the other side. A first protective pattern 601 covers the first gate insulating pattern 201, the semiconductor pattern 301, the data lines 501, and source and drain electrodes 502 and 503 over the gate line 101 and the gate electrode 102. The first protective pattern 601 has substantially the same shape as the first gate insulating pattern 201 except that it is removed over the drain electrode 503. The first protective pattern 601 and the first gate insulating pattern 201 are absent over the pixel area defined by the neighboring gate and data lines 101 and 501.

Meanwhile, a protrusion pattern 15 having one or more protrusions is formed at the pixel area. The protrusion pattern 15 has a double layered structure where a second protective pattern 602 is formed on a second gate insulating pattern 202. The second gate insulating pattern is formed with the same material as the first gate insulating pattern 201, and the second protective pattern 602 is formed with the same material as the first protective pattern 601. The protrusion pattern 15 has a protrusion width of 3-8 μm.

In the following preferred embodiments, the pixel area will be considered to have a substantially rectangular shape with first and second long sides, and first and second short sides. It is further assumed that the rectangular-shaped pixel area has an upper region with the first short side, and a lower region with the second short side, and the upper and lower regions are bisected by a center line.

The protrusion pattern 15 is symmetrically formed at the upper and lower pixel regions while proceeding at 45° with respect to the center line. The protrusion pattern 15 includes top, middle and bottom protrusions.

The middle protrusion has a V-shaped base positioned around the center line while facing the first long side of the pixel area. The V-shaped base has a bent portion on the center line, and two wings symmetrically extended from the bent portion up and downward while being tilted at 45° with respect to the center line. A first limb 151 is horizontally extended from the bent portion of the V-shaped base toward the second long side of the pixel area along the center line, and second limbs vertically extended from the wings of the V-shaped base up and downward along the first long side of the pixel area, respectively.

The top protrusion of the protrusion pattern 15 has a first linear base proceeding parallel to the upper wing of the V-shaped base of the middle protrusion. A first limb 151 is horizontally extended from the top end of the first linear base along the first short side of the pixel area, and a second limb 152 is vertically extended from the bottom end of the first linear base along the second long side of the pixel area.

The bottom protrusion has a second linear base proceeding parallel to the lower wing of the V-shaped base of the middle protrusion. A first limb 151 is horizontally extended from the bottom end of the second linear base along the second short side of the pixel area, and a second limb 152 is vertically extended from the top end of the linear base along the second long side of the pixel area.

Meanwhile, a pixel electrode 16 of ITO or IZO covers the protrusion pattern 15 while contacting the exposed portion of the drain electrode 50. Some portion of the pixel electrode 16 at the pixel area is removed to thereby form an opening pattern 3. The opening pattern 3 is symmetrically formed at the upper and lower pixel regions while proceeding at 45° with respect to the center line. The opening pattern 3 has top, middle and bottom opening portions.

The top opening portion is placed between the bases of the top and middle protrusions of the protrusion pattern 15 while proceeding parallel thereto. The bottom opening portion is placed between the bases of the middle and bottom protrusions of the protrusion pattern 15 while proceeding parallel thereto. The middle opening portion proceeds from the first long side of the pixel area toward the bent portion of the V-shaped base of the middle protrusion along the center line.

Roughly, the protrusion pattern 15 and the opening pattern 3 are alternately arranged parallel to each other.

A vertical alignment film (not shown) is formed on the pixel electrode 16.

The color filter substrate 20 facing the TFT array substrate 10 has a light interception layer 700 corresponding to the TFT and the gate and data lines 101 and 501 external to the pixel area, and color filters 801 and 802 corresponding to the pixel area. A common electrode 25 of ITO or IZO is formed on the color filters 801 and 802, and a vertical alignment film (not shown) is coated onto the common electrode 25.

In the liquid crystal display structured with the aforementioned protrusion pattern 15 and the opening pattern 3, the orientation directions of the liquid crystal molecules are differentiated at the two side regions of the protrusion pattern 15 or the opening pattern 3. That is, the pixel area is divided into two domains on the basis of the protrusion pattern 15 and the opening pattern 3, respectively. Furthermore, as the portions of the opening and protrusion patterns 3 and 15 at the upper region of the pixel area proceed symmetrical to those at the lower region, the orientation directions of the liquid crystal molecules at the upper region are also symmetrical to those of the liquid crystal molecules at the lower region. Consequently, the pixel area is divided into four domains where the orientation directions of the liquid crystal molecules are differentiated, and this results in a wide viewing angle.

The protrusion pattern 15 and the opening pattern 3 are not limited to the above shapes, but can be altered in various manners on the condition that the pixel area is divided into four domains based on the orientation directions of the liquid crystal molecules.

As described above, the electric field at the region of the protrusion pattern 15 is relatively wide, whereas the electric field at the region of the opening pattern 3 is relatively narrow because it is focused on the common electrode 25. Therefore, the pixel area can be effectively divided into multiple domains while improving the viewing angle characteristics. Furthermore, as the formation of the opening or protrusion pattern is necessary only on the TFT array substrate side, the performance characteristics of the common electrode 25 of the color filter substrate are not deteriorated, and production efficiency can be enhanced.

Figure 9A:
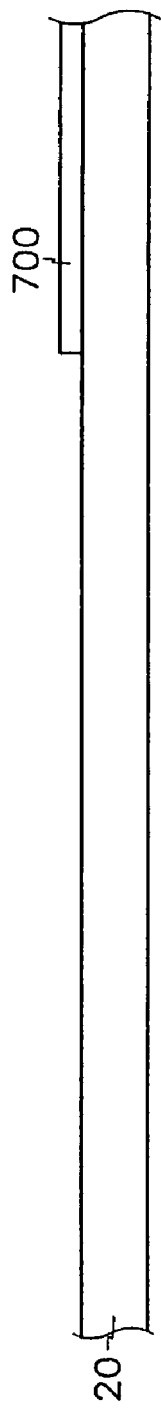
FIGS. 9A to 9C are cross sectional views of the liquid crystal display shown in FIG. 5, illustrating the steps of processing a color filter substrate for the liquid crystal display in a sequential manner.
Figure 9B:
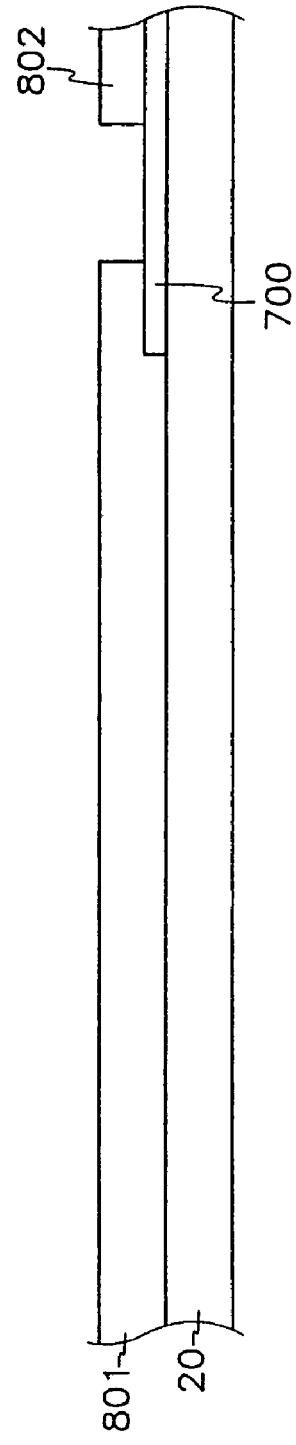
Figure 9C:
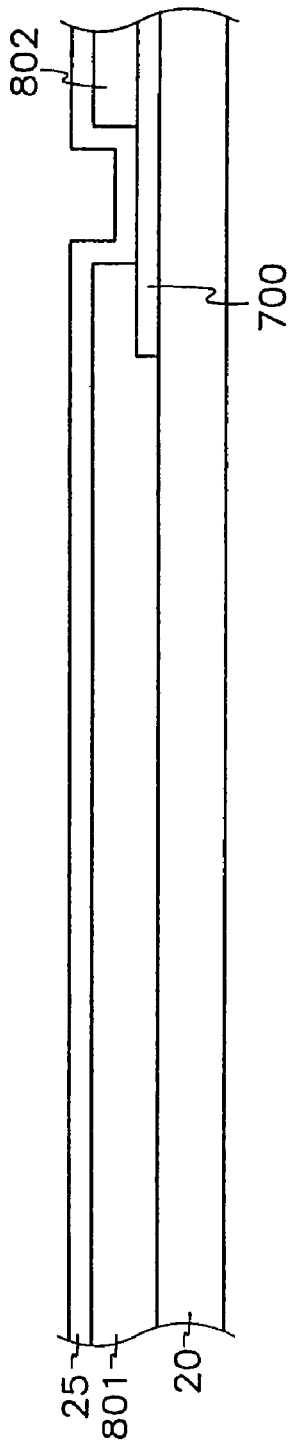

FIGS. 9A to 9C illustrate the steps of processing the color filter substrate for the liquid crystal display shown in FIG. 5.

As shown in FIGS. 9A to 9C, a matrix type light interception layer 700 is formed on the color filter substrate 20 to shield the periphery of the pixel area, and color filters 801 and 802 are formed at the pixel area where the light interception layer is absent. Thereafter, an ITO or IZO film is deposited onto the substrate 20 to form a common electrode 25. A vertical alignment film (not shown) is coated onto the common electrode 20 to thereby complete the color filter substrate.

FIGS. 10A to 10F illustrate the steps of processing the TFT array substrate for the liquid crystal display shown in FIG. 5.

As shown in FIG. 10A, a gate line assembly including gate lines 101 and gate electrodes 102 is formed on the substrate 10, and a gate insulating layer 200 is then formed on the gate line assembly.

Thereafter, as shown in FIG. 10B, an amorphous silicon semiconductor layer and a doped amorphous silicon ohmic contact layer are sequentially deposited onto the substrate 10, and etched together to thereby form an ohmic contact pattern 401 and a semiconductor pattern 301.

As shown in FIG. 10C, a data line assembly including data lines 501, and source and drain electrodes 502 and 503 are formed on the structured substrate 10, and the ohmic contact pattern 401 is etched by using the source and drain electrodes 502 and 503 as a mask.

As shown in FIG. 10D, a protective layer 600 is deposited onto the structured substrate 10.

Thereafter, as shown in FIG. 10E, the protective layer 600 and the underlying gate insulating layer 200 are etched to thereby form a first protective pattern 601 and a gate insulating pattern 201 over the TFT, the gate lines 101 and the data lines 601 external to the pixel area, and a protrusion pattern 15 at the pixel area. The protrusion pattern 15 is formed with the second protective pattern 602 and the second gate insulating pattern 202. Furthermore, in this step, the protective layer 600 over the drain electrode 503 is removed to partially expose the drain electrode 503 to the outside.

The layered structure of the protrusion pattern 15 may be altered by applying different formation techniques. For instance, in the case when the TFT array substrate is fabricated through four mask processes, the gate insulating layer, the ohmic contact layer, the semiconductor layer and the metal layer for the data line assembly are etched together to thereby form a data line, a semiconductor pattern and an ohmic contact pattern. In this step, the protrusion pattern may be formed with the metal layer for the data line assembly, the semiconductor layer and the ohmic contact layer.

As shown in FIG. 10F, a transparent conductive layer of ITO or IZO is deposited onto the substrate 10, and etched to thereby form a pixel electrode 16 at each pixel area, and an opening pattern 3. The pixel electrode 16 contacts the exposed portion of the drain electrode 503, and the opening pattern 3 is positioned within the pixel electrode 16 at the pixel area.

A vertical alignment film (not shown) is coated onto the pixel electrode 16 with the opening pattern 3 to thereby complete a TFT array substrate.

The TFT array substrate is then aligned with the color filter substrate such that the pixel electrode 16 of the former faces the common electrode 25 of the latter. The substrates are then combined with each other under the application of sealant, and polarizer films are externally attached to the substrates to thereby complete a liquid crystal display.

In the aforementioned process, as only the TFT array substrate is structured to have the protrusion pattern 15 and the opening pattern 3, the possible misalignment occurring when such patterns are separately formed at the TFT array and the color filter substrates is prevented.

Furthermore, as the protrusion pattern 15 and the opening pattern 3 of the TFT array substrate are formed during the step of exposing the drain electrode 503 by etching the protective layer 600 and the gate insulating layer 200 and the step of etching the pixel electrode 16, additional processing steps for forming the protrusion pattern 15 and the opening pattern 3 are not required.

In addition, since the common electrode 25 of the color filter substrate does not have any opening pattern, the photolithography process for forming such an opening pattern at the common electrode 25 or the process for forming an overcoat buffer layer for protecting the color filter from the etching solution is not required. In this way, the processing steps can be simplified, and the possible increase in the resistance, overetching or undercut of the common electrode 25 in the presence of an opening pattern can be completely prevented.

The above-described structure of the liquid crystal display may be referred to as the "enhanced vertical alignment (EV) mode."

In the EV mode liquid crystal display, the TFT array substrate basically has at least two protrusions and a pixel electrode with an opening pattern at each pixel area where one of the protrusions is covered by the pixel electrode and the other protrusion is exposed through the opening pattern. In this structure, the orientation directions of the liquid crystal molecules can be effectively differentiated based on the protrusion and opening patterns, and disclination regions can be reduced in width. Furthermore, as the protrusion pattern can be formed during the TFT formation process by using the TFT formation layers such as the protective layer, the gate insulating layer and the semiconductor layer, and the opening pattern can be formed during the pixel electrode formation process, separate processing steps with additional materials for the pattern formation are not required.

As described above, a new pattern structure capable of effectively dividing the pixel area into multiple domains is formed at one substrate so that the processing steps can be simplified, and possible non-uniformity in the orientation directions of the liquid crystal molecules at the separate domains due to misalignment of the substrates can be prevented.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display, comprising:
  a first substrate;
  a gate line assembly formed on the first substrate, the gate line assembly comprising a gate line and a gate electrode;
  a gate insulating layer covering the gate line assembly;
  a semiconductor pattern formed on the gate insulating layer over the gate electrode;
  a data line assembly formed on the gate insulating layer and the semiconductor pattern, the data line assembly comprising a source electrode, a drain electrode and a data line, the data line crossing the gate line;
  a protective layer covering the gate insulating layer, the semiconductor pattern, the data line, the source electrode and the drain electrode over the gate line and the gate electrode except a portion of the drain electrode;
  a protrusion formed at the first substrate, the protrusion comprising an under-layer formed with the same material as the gate insulating layer, and an over-layer formed with the same material as the protective layer;
  a pixel electrode connected to the drain electrode and covering the protrusion;
  a second substrate facing the first substrate; and
  a common electrode formed at the second substrate.

2. The liquid crystal display of claim 1, wherein the protective layer is an organic layer.

3. The liquid crystal display of claim 2, further comprising an opening, the protrusion and the opening dividing a pixel area into a plurality of domains.

4. The liquid crystal display of claim 3, wherein the protrusion has a portion substantially parallel to a portion of the opening.

5. The liquid crystal display of claim 2, wherein the gate insulating layer has the same shape as the protective pattern except a portion under the drain electrode.

6. The liquid crystal display of claim 2, further comprising color filters formed at the second substrate corresponding to pixel areas of the first substrate, the color filters positioned between the common electrode and the second substrate; and a light interception layer interposed between neighboring color filters.

7. The liquid crystal display of claim 2, further comprising a negative dielectric anisotropy liquid crystal sandwiched between the first and second substrates.

8. The liquid crystal display of claim 2, further comprising vertical alignment films formed on the pixel electrode and the common electrode to vertically align liquid crystal molecules.

9. The liquid crystal display of claim 2, wherein the common electrode is formed with indium tin oxide or indium zinc oxide.

10. The liquid crystal display of claim 9, wherein the pixel electrode is formed with indium tin oxide or indium zinc oxide.

11. The liquid crystal display of claim 2, further comprising an ohmic contact layer disposed between the semiconductor pattern and the source and drain electrodes.

12. The liquid crystal display of claim 1, wherein the protective layer is absent at a portion of a pixel area defined by neighboring gate and data lines.

* * * * *